United States Patent [19]

Reinholm et al.

[11] Patent Number: 4,903,011
[45] Date of Patent: Feb. 20, 1990

[54] LAMP DRIVE CIRCUIT

[75] Inventors: James H. Reinholm, Farmington Hills; Dana A. Stonerook, Plymouth; Roger A. McCurdy, Troy, all of Mich.

[73] Assignee: TRW Inc., Lyndhurst, Ohio

[21] Appl. No.: 140,390

[22] Filed: Jan. 4, 1988

[51] Int. Cl.[4] .......................................... G08B 21/00
[52] U.S. Cl. .................................. 340/641; 307/10.8; 340/458
[58] Field of Search ............... 340/84, 85, 641, 642, 340/635, 650, 649; 307/10 LS, 66

[56] References Cited

U.S. PATENT DOCUMENTS

| | | | |
|---|---|---|---|
| 3,883,777 | 5/1975 | Morita | 315/88 |
| 3,944,889 | 3/1976 | Conway | 317/31 |
| 4,099,157 | 7/1978 | Enabnit | 340/52 F |
| 4,214,236 | 7/1980 | Carp et al. | 340/642 |
| 4,222,047 | 9/1980 | Finnegan | 340/641 |
| 4,236,146 | 11/1980 | Clark et al. | 340/517 |
| 4,321,579 | 3/1982 | Jochmann et al. | 340/52 F |
| 4,447,806 | 5/1984 | Gundel et al. | 340/641 |
| 4,574,266 | 3/1986 | Valentine | 340/52 F |
| 4,682,078 | 7/1987 | Pascalide | 307/66 |

OTHER PUBLICATIONS

"Electronic Lamp Monitoring" SAE Spring Conference, May 22, 1972 by McNamee & Marshall.
"Outage Detection" Society of Automotive Engineers, National Automobile Engineering Meeting, Detroit, MI, May 22–26, 1972 by Scharf.

*Primary Examiner*—Herbert Goldstein
*Assistant Examiner*—Jeffery A. Hofsass
*Attorney, Agent, or Firm*—Tarolli, Sundheim & Covell

[57] ABSTRACT

The apparatus for driving and monitoring a lamp includes a main drive circuit, a backup drive circuit, a monitoring circuit, all connected to a controller. If the controller determines that the main drive circuit cannot energize the lamp, the backup circuit is enabled to energize the lamp. For purposes of energizing the lamp, the lamp is connectable to one of two electrical ground references. If one of the ground references becomes open circuited from the remainder of the circuitry, then the lamp is energized through the other ground reference.

33 Claims, 4 Drawing Sheets

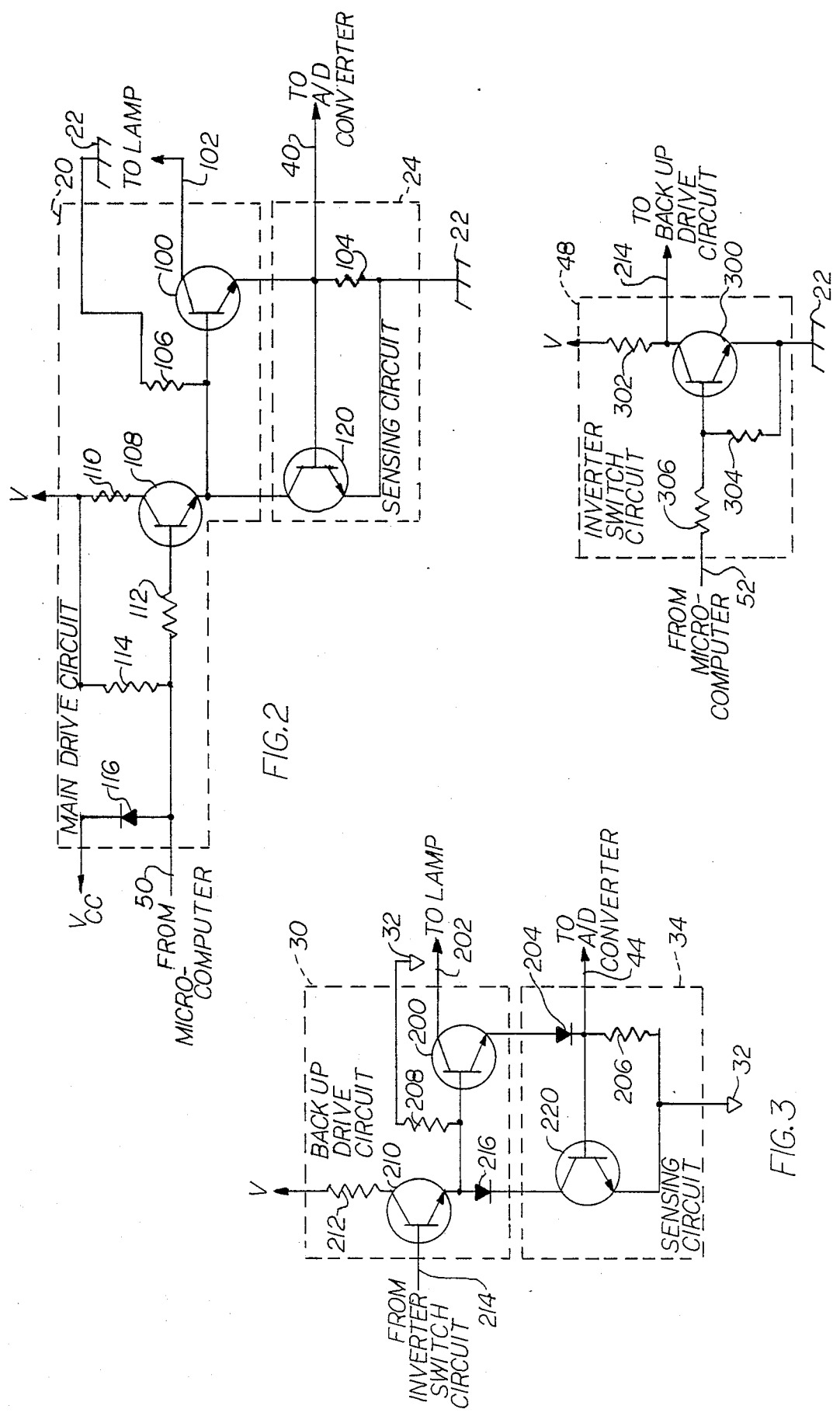

LAMP DRIVE CIRCUIT

TECHNICAL FIELD

The present invention relates to a lamp drive circuit and is particularly directed to an apparatus for monitoring a lamp's operation and for providing backup drive circuitry when main drive circuitry fails to energize the lamp.

BACKGROUND OF THE INVENTION

Electrical load driving and monitoring circuits are known in the art. One example of such a circuit is described in U.S. Pat. No. 4,574,266 to Valentine. The circuit described therein includes a main electrical load connected in series with a load switch circuit, the series combination being connected across a source of electrical energy. A test circuit and a load detector circuit are both connected to a microcomputer. The microcomputer controls actuation of a switching device in the load switch circuit which, in turn, controls energization of the main load. The circuit described in the '266 patent is capable of detecting electrical conditions of the main load such as an electrical open or an electrical short. When an electrical short condition is detected, the switching device of the load switch circuit is de-energized to disconnect the main load from the source of electrical energy. A load status circuit is provided to indicate the status of the main load and to provide a redundant load in the event of a failure of the main load.

Certain other types of failures can occur in a lamp drive circuit which have not been addressed by prior art circuits. For example, it is possible for a switching device, which is used to connect the lamp to the source of electrical energy, to fail. Also, the signal used to actuate the switching device may become disconnected from the switching device or may become short circuited to a signal which renders it ineffective to actuate the switching device. Furthermore, it is possible for the lamp drive circuit to become disconnected from electrical ground. If any of these types of failures occur, lamp drive circuits known the art would be unable to energize the lamp.

SUMMARY OF THE INVENTION

The present invention is directed to an apparatus for energizing and monitoring the operation of an electrical load such as an indicator lamp. The apparatus includes a controller connected to a main drive circuit, a backup drive circuit, and a monitoring circuit, all of which are, in turn, operatively connected to the lamp. If the controller determines through the monitoring circuit that the main drive circuit has failed to energize the lamp, the controller enables the backup circuit to energize the lamp. The lamp is connectable to either of two electrical grounds, i.e., signal ground and chassis ground. If one of the electrical grounds becomes disconnected from the apparatus, circuitry is provided to automatically energize the lamp through the other of the two electrical grounds.

In accordance with one aspect of the present invention, an apparatus is provided for energizing a lamp. The apparatus includes a main drive circuit for, when enabled by a first control signal, connecting the lamp to a source of electrical energy. A backup drive circuit is provided for, when enabled by a second control signal, connecting the lamp to a source of electrical energy. The apparatus also includes sensing means for providing a signal indicative of the lamp being energized. The apparatus further includes control means for providing the first control signal and the second control signal, and for monitoring the signal provided by the sensing means. The control means provides the second control signal when the first control signal is provided and the signal from the sensing means indicates the lamp is not energized.

In accordance with another aspect of the present invention, an apparatus is provided for energizing an indicator lamp. The apparatus includes a first electrical ground reference and a second electrical ground reference. The apparatus further includes means connected to one terminal of the lamp for providing electrical potential relative to the first ground reference and to the second ground reference. First actuatable switch means is provided responsive to a first control signal for providing a connection between the other lamp terminal and the first ground reference. Sensing means provides a signal indicative of the other terminal of the lamp not being connectable to the first electrical ground reference through the first actuatable switch means. The apparatus further includes second actuatable switch means for connecting the other terminal of the lamp to the second ground reference when the sensing means provides the signal indicative of the other terminal of the lamp not being connectable to the first ground reference.

In accordance with yet another aspect of the present invention, the first control signal and the second control signal are digital signals. The first digital control signal being one digital state to enable the main drive circuit. The second digital control signal being another digital state to enable the backup drive circuit. The control means provides the second digital control signal when the first digital control signal has been provided and the sensing means indicates the lamp is not energized.

In accordance with a preferred embodiment of the present invention, a first terminal of an indicator lamp is connected to a source of electrical energy. The second terminal of the lamp is connectable through a main drive circuit to a first ground reference, and is also connectable through a backup drive circuit to a second ground reference. The lamp is energizable through either the main drive circuit in response to a first control signal or the backup drive circuit in response to a second control signal.

A first current sensing circuit is associated with the main drive circuit for providing an output signal indicative of the current flow from the source of electrical energy to the first ground reference through the lamp and the main drive circuit. Similarly, a second current sensing circuit is associated with the backup drive circuit for providing an output signal indicative of the current flow from the source of electrical energy to the second ground reference through the lamp and the backup drive circuit. A third sensing circuit is provided to monitor the voltage value at the second terminal of the lamp and to provide a signal having a value indicative of the voltage value at the second lamp terminal. An analog-to-digital ("A/D") converter digitizes the output signal from the first, second, and third sensing circuits.

A microcomputer, referenced to the second ground reference, monitors the digitized representations of the output signals from the sensing circuits. The microcomputer generates the first control signal in response to an input signal indicative of a desire to energize the lamp. The microcomputer generates the second control signal when the first control signal is generated and the output signal from the first sensing circuit indicates that the lamp is not energized.

An inverter circuit is connected between the microcomputer and the backup drive circuit. The first control signal and the second control signal are digital. The first and second control signals are opposite from each other to respectively actuate their associated drive circuitry.

The first sensing circuit includes circuitry to immediately limit current flow through the main drive circuit when the value of the sensing circuit output exceeds a first predetermined limit. If the output of the first sensing circuit is between second and third predetermined limits, the microcomputer determines the power dissipation by the switching device in the main drive circuit that connects the second lamp terminal to the first ground reference. If the predetermined power dissipation exceeds a limit, then such is indicative of an excessive current draw by the lamp. If the output signal from the first sensing circuit exceeds the third predetermined value, then such is indicative of the lamp being short circuited. The microcomputer, upon determining the presence of a shorted lamp condition or excessive current draw by the lamp, removes the first control signal to disable the main drive circuit.

The second sensing circuit is similar to the first sensing circuit. The second sending circuit includes circuitry to immediately limit current flow through the backup drive circuit when the output signal from the second sensing circuit exceeds a first predetermined value. The microcomputer, upon determining the presence of a shorted lamp condition or excessive current draw by the lamp in a similar manner as discussed with regard to the main drive circuit, removes the second control signal to disable the backup drive circuit.

If the main drive circuit is enabled and the output of the first sensing circuit is below a predetermined value, such is indicative of the lamp not being energized. Upon such occurrence, the microcomputer determines the voltage value present at the second lamp terminal. If the determined voltage value at the second lamp terminal is below a predetermined limit, the lamp is considered open circuited. When the lamp is determined to be open circuited, both the main drive circuit and the backup drive circuit are enabled and the occurrence is recorded in a nonvolatile memory.

The main drive circuit is referenced to the first ground reference and the backup drive circuit is referenced to the second ground reference. The inverter associated with the backup drive circuit is referenced to the first ground reference. If the first ground reference becomes disconnected from the remainder of the circuitry, the inverter senses such condition and enables the backup drive circuit to energize the lamp through the second ground reference.

The first sensing circuit also monitors the connection to the first ground reference. If the first ground reference becomes disconnected from the remainder of the circuitry, the first sensing circuit outputs a signal indicative thereof. The microcomputer monitors the signal from the first sensing circuit and records the occurrence of the first ground reference becoming disconnected from the remainder of the circuitry.

The main drive circuit is arranged so that if an open circuit condition occurs between the second ground reference and the microcomputer, the main drive circuit is automatically enabled. The lamp, upon such occurrence, is connected to the first ground reference through the main drive circuit and is thereby energized.

BRIEF DESCRIPTION OF THE DRAWINGS

Other features and advantages of the present invention will become apparent to those skilled in the art to which the present invention relates from reading the following detailed description in conjunction with the accompanying drawings, wherein:

FIG. 2 is a schematic diagram of a main drive circuit and associated sensing circuit used in the lamp drive and monitoring circuit of FIG. 1;

FIG. 3 is a schematic diagram of a backup drive circuit and associated sensing circuit used i the lamp drive and monitoring circuit of FIG. 1;

FIG. 4 is a schematic diagram of an inverter switch circuit used in the lamp drive and monitoring circuit of FIG. 1;

BEST MODE FOR CARRYING OUT THE INVENTION

The present invention is described with reference to use in an automotive vehicle. It will be appreciated that its use is not limited thereto.

Figure 1:
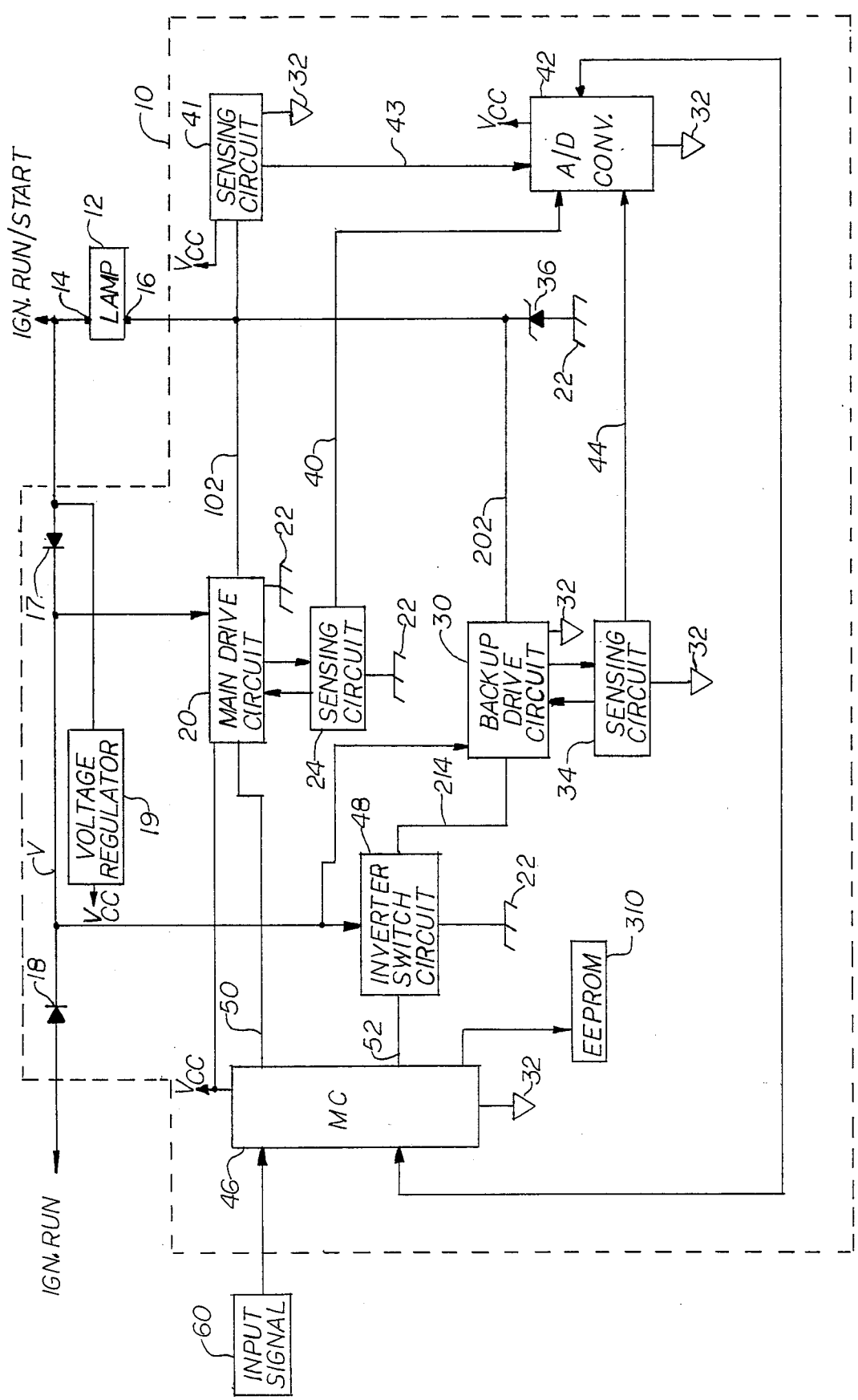
FIG. 1 is a schematic block diagram of a lamp drive and monitoring circuit made in accordance with the present invention.

Referring to FIG. 1, a lamp drive and monitoring circuit 10 is shown for energizing a lamp 12. The lamp 12 has a first terminal 14 connected to a positive potential of a source of electrical energy, such as the vehicle battery, through the RUN/START position of the vehicle ignition switch. The other terminal 16 of the lamp 12 is connected to the circuit 10.

The circuit 10 is connected to the positive battery potential through both the RUN/START position and the RUN position of the vehicle ignition switch. The two connections through the ignition switch are wire ORED through diodes 17, 18 to form a source potential V. A voltage regulator 19 is connected to the positive battery potential through the RUN/START position of the ignition switch. The voltage regulator 19 supplies operating voltage Vcc for the other elements of circuit 10. In a preferred embodiment, Vcc is equal to 5 VDC.

The circuit 10 includes a main drive circuit 20 connected to the source potential V, the voltage Vcc, and the terminal 16 of the lamp 12. The main drive circuit 20, when enabled, connects the lamp 12 to a first ground reference 22 through an associated sensing circuit 24. The circuit 10 further includes a backup drive circuit 30 connected to the source potential V and to the terminal 16 of the lamp 12. The backup drive circuit 30, when enabled, connects the lamp 12 to a second ground reference 32 through an associated sensing circuit 34. If the lamp 12 is functional, it is energized to light when terminal 16 of lamp 12 is connected to either the first ground reference 22 or the second ground reference 32. A Zener diode 36 is connected to the terminal 16 of the lamp and to the first ground reference 22 and limits the lamp source voltage to the main drive circuit 20 and the backup drive circuit 30.

The sensing circuit 24 associated with the main drive circuit 20 outputs a signal 40 having a value indicative of the current flow through the main drive circuit 20. The output 40 of the sensing circuit 24 is connected to an analog-to-digital ("A/D") converter 42. The A/D converter 42 is connected to the second ground reference 32 and to the voltage Vcc. The sensing circuit 34 associated with the backup drive circuit 30 outputs a signal 44 to the A/D converter 42, the signal 44 having a value indicative of the current flow through the backup drive circuit 30.

A third sensing circuit 41 is electrically connected to terminal 16 of the lamp 12 and outputs a signal 43 to the A/D converter 42. The signal 43 has a value indicative of the voltage value present at terminal 16. The sensing circuit 41 is also connected to the second ground reference 32 and to the voltage Vcc.

The A/D converter 42 is operatively connected to a microcomputer 46. The interaction between a microcomputer and an A/D converter is well known in the art and need not be discussed herein in detail. Basically, the microcomputer 46 addresses a line it desires the A/D converter 42 to monitor. The A/D converter 42 outputs to the microcomputer 46 a digital representation of the analog value of the monitored input line 40, 43, 44. In the present circuit, the A/D converter 42 outputs a digital representation of the analog value of output signal from either the sensing circuit 24, the sensing circuit 34, or the sensing circuit 41.

The microcomputer 46 outputs a first control signal on line 50 to the main drive circuit 20 and a second control signal on line 52 to the backup drive circuit 30 through an inverter switch circuit 48. The microcomputer 46 is connected to the second ground reference 32. The inverter switch circuit 48 is connected to the first ground reference 22.

To enable the main drive circuit 20, the microcomputer 46 outputs a digital HIGH on line 50. To enable the backup drive circuit 30, the microcomputer outputs a digital LOW on line 52. The inverter switch circuit 48, in response to the digital LOW on line 52, outputs a digital HIGH to the backup drive circuit 30. The digital HIGH on the input of the backup drive circuit 30 enables the backup drive circuit.

An input signal 60 is operatively connected to the microcomputer 46. In response to the input signal 60, the microcomputer 46 determines whether it is to try and energize, i.e., light, the lamp 12. If it is desired to energize the lamp, the input signal 60 is in one condition. If it is desired to not energize the lamp, the input signal 60 is in a different condition.

The inverter switch circuit 48 is arranged to output a digital HIGH to the backup drive circuit 30 upon the occurrence of one of two conditions. If the output 52 of the microcomputer 46 is a digital LOW, the output of the inverter switch circuit 48 is a digital HIGH. If the connection between the first ground reference 22 and the inverter switch circuit 48 becomes electrically open, the output of the inverter switch circuit 48 is a digital HIGH.

In the preferred embodiment, the circuit 10 is assembled on a circuit board. The ground references 22, 32 are provided by different connections to the circuit board. If the ground reference 22 becomes disconnected from the inverter switch circuit 48, the ground reference 22 is probably disconnected from the remainder of the circuit 10.

If the input signal 60 indicates that it is desired to energize the lamp 12, the microcomputer 46 outputs a digital HIGH on line 50. If the microcomputer 46 should become disconnected from the second ground reference 32, an internal pull-up resistor in the main drive circuit 20 pulls line 50 to a digital HIGH state which immediately causes the main drive circuit to be enabled thereby connecting the lamp to the first ground reference 22. Again, the preferred embodiment of circuit 10 is assembly on a circuit board. If the ground reference 32 becomes disconnected from the microcomputer 46, the ground reference 32 is probably disconnected from the remainder of the circuit 10.

Referring to FIG. 2, the main drive circuit 20 includes a transistor 100 having its collector connected to terminal 16 of lamp 12 through line 102. The emitter of the transistor 100 is connected to the first ground reference 22 through a sensing resistor 104 of the sensing circuit 24. The junction between sensing resistor 104 and the emitter of transistor 100 is connected to one input of the A/D converter 42 through line 40. The base of the transistor 100 is connected through a resistor 106 to the first ground reference 22.

The main drive circuit 20 further includes a transistor 108 having its collector connected to the positive potential V through a resistor 110. The emitter of the transistor 108 is connected to the base of transistor 100. The base of the transistor 108 is connected to the positive potential V through resistors 112, 114. A diode 116 has its cathode connected to the positive potential Vcc and its anode connected to the junction between resistors 112 and 114. The junction between the resistor 112 and the resistor 114 is connected to the line 50 which is, in turn, connected to the microcomputer 46. The resistive values of resistors 106, 110, 112, 114 are selected so that transistor 108 would be biased ON if the output on line 50 from the microcomputer 46 were to become disconnected from the main drive circuit 20 or if the microcomputer could not provide an electrical potential sufficient to pull the base of transistor 108 down to a potential to turn it OFF.

The sensing circuit 24 further includes a transistor 120 having its base connected to the junction between sensing resistor 104 and the emitter of transistor 100, its collector connected to the base of transistor 100, and its emitter connected to the first ground reference 22. When output 50 of the microcomputer 46 is a digital LOW, the transistor 108 is OFF. When the transistor 108 is OFF, the transistor 100 is OFF. Thus, the lamp 12 is not energized through the main drive circuit 22. The electrical potential on line 40 is equal to the electrical potential of the first ground reference 22 which is indicative of the lamp 12 not being energized through the main drive circuit 20.

When the microcomputer 46 provides a digital HIGH signal on line 50, transistor 108 turns ON. When the transistor 108 is ON, the transistor 100 is ON. A current path is established between terminal 16 of the lamp 12 to the first ground reference 22 through the transistor 100 and the sensing resistor 104. The lamp 12, if functional, is thereby energized.

When the lamp 12 is energized through the main drive circuit 22, a voltage is developed across the sensing resistor 104. The A/D converter 42 monitors the voltage developed across resistor 104 and provides a digitized signal indicative thereof to the microcomputer 46. When the microcomputer determines that the voltage developed across the first sensing resistor 104 is below a first predetermined value, such is indicative that the lamp 12 is not energized.

Figure 5:
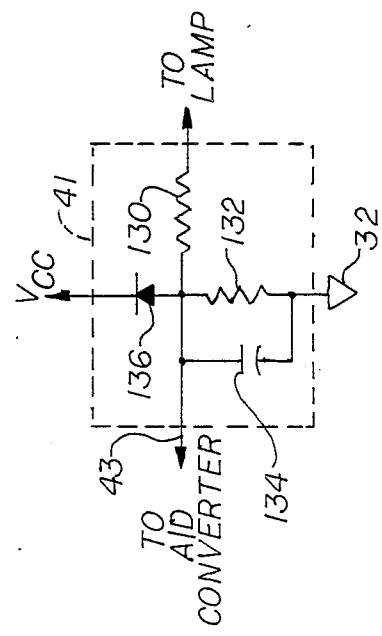
FIG. 5 is a schematic diagram of a sensing circuit used in the lamp drive and monitoring circuit of FIG. 1.

Referring to FIG. 5, the sensing circuit 41 includes a resistor dividing network having resistors 130, 132 connected in series between the lamp terminal 16 and the second ground reference 32. The junction between resistors 130, 132 is connected to the A/D converter 42 through line 43. A filter capacitor 134 is connected between the junction of resistors 130, 132 and the second ground reference 32. A diode 136 has its anode connected to the junction of resistors 130, 132 and its cathode connected to the positive potential Vcc. When the lamp is not open circuited, a voltage is present at the junction of resistors 130, 132 having a value which is functionally related to the value of the battery voltage and the value of the resistors 130, 132. When the lamp is open circuited, the voltage value at the junction of resistors 130, 132 is equal to the second ground potential 32. The microcomputer continuously monitors, i.e., each machine cycle, the voltage on line 43 to determine if the lamp is open circuited. If the lamp is determined to be open circuited, both the main drive circuit 20 and the backup drive circuit 30 are enabled and the occurrence is recorded in a nonvolatile memory 310.

If the lamp 12 is short circuited, current flow through the main drive circuit 20 and, in turn, through the first sensing resistor 104 increased. The increased current flow through the first sensing resistor 104 increases the voltage developed thereacross. When the developed voltage reaches a second predetermined value, transistor 120 begins to conduct which lowers the potential present at the base of transistor 100. When the electrical potential on the base of the transistor 100 is lowered, the collector emitter current flow through transistor 100 reduces.

A current flow through the sensing resistor 104 sufficient to cause transistor 120 to conduct can result from occurrences other than a shorted lamp. For example, a bulb of improper size, i.e., current draw rating, may be connected to the lamp drive circuit. The current draw by the bulb may be excessive for the current ratings of the transistor 100. Also, current in-rush occurs when a bulb is first energized because bulb resistance is functionally related to filament temperature. As the filament temperature increases, the current draw through the bulb decreases.

The purpose of transistor 102 is to limit current flow through transistor 100 until the microcomputer 46 can respond. If the voltage developed across resistor 104 is between a third predetermined value and a fourth predetermined value, such occurrence is indicative of excessive current draw that may lead to premature failure of the transistor 100. To determine if the main drive circuit should be disabled upon the occurrence of such condition, the microcomputer 46 determines the voltage value at the collector of transistor 100 through the sensing circuit 41 and measures the emitter voltage of transistor 100 by measuring the voltage value developed across resistor 104 as is present on line 40. To determine the voltage present at the collector of transistor 100, the microcomputer multiplies the voltage value present on line 43 by a value functionally related to the value of resistors 130, 132. The microcomputer subtracts the voltage across resistor 104 (the emitter voltage of transistor 100) from the determined collector voltage. This resultant subtraction is functionally related to the power dissipation by transistor 100. If the resultant subtraction is greater than a predetermined limit indicative of excessive power dissipation, the microcomputer disables the main drive circuit 20.

If the voltage developed across resistor 104 is greater than the fourth predetermined value, the lamp 12 is considered shorted. The microcomputer 46, upon sensing such a voltage value across resistor 104, switches the output 50 to a digital LOW. When output 50 is LOW, transistors 108 and 100 switch OFF.

In accordance with a preferred embodiment of the present invention, the microcomputer 46, upon detecting a shorted lamp condition, i.e., the output signal of sensing circuit 24 is greater than the fourth predetermined limit, does not output the second control signal to try and energize the lamp through the backup drive circuit 30. The microcomputer times out a period of time sufficient to permit transistor 100 to cool down and then switches the output 50 to a digital HIGH to try and energize the lamp through the main drive circuit. If an electrical short is still present, the transistor 120 immediately limits current flow through transistor 100 until the microcomputer 46 can respond. This cycle continues to repeat. The cycle time is sufficient to ensure that the temperature of transistor 100 does not exceed the manufacturer's specification.

Referring to FIG. 3, the backup drive circuit 30 includes a transistor 200 having its collector connected to terminal 16 of the lamp 12 through a line 202. The emitter of transistor 200 is connected to the second ground reference 32 through a diode 204 and current sensing resistor 206 of the sensing circuit 34. The base of transistor 200 is connected to the second ground reference 32 through a resistor 208. A transistor 210 is provided having its emitter connected to the base of transistor 200, its collector connected to the positive potential V through a resistor 212, and its base connected to the output of the inverter switch circuit 48 through line 214. The base of transistor 200 is further connected to the anode of a diode 216. The sensing circuit 34 further includes a transistor 220 having its emitter connected to the second ground reference 32, its base connected to the junction of sensing resistor 206 and diode 204, and its collector connected to the cathode of the diode 216.

When a digital LOW is present on line 214, the transistor 210 is OFF. When the transistor 210 is OFF, the transistor 200 is OFF. When transistor 200 is OFF, the lamp 12 is not energized through the backup drive circuit 30. Also, when transistor 200 is OFF, the electrical potential at the junction of sense resistor 206 and diode 204 is equal to the electrical potential of the second ground reference 32.

The backup drive circuit 30 is enabled when a digital HIGH is present on line 214. When this occurs, transistor 210 turns ON. When the transistor 210 turns ON, the transistor 200 turns ON. A current path is established between terminal 16 of the lamp 12 and the second ground reference 32 through the transistor 200, diode 204, and the sensing resistor 206.

When the lamp 12 is energized through the backup drive circuit 30, a voltage is developed across the sensing resistor 206 having a value which is indicative of the lamp 12 being energized. When the voltage developed across the sensing resistor 206 is below a fifth predetermined value, such is indicative of the lamp 12 not being energized. The A/D converter 42 monitors the voltage developed across the sense resistor 206 and provides a digitized indication thereof to the microcomputer 46.

When the voltage across the sensing resistor 206 reaches a sixth predetermined value, the transistor 220 begins to conduct. Current flow through transistor 220 lowers the electrical potential at the base of transistor 200. The collector-emitter voltage of transistor 200 decreases, in turn decreasing the voltage developed across resistor 206. The back-up drive circuit is controlled in similar manner as described with regard to the main drive circuit 20. Specifically, when the developed voltage across resistor 206 is between a seventh predetermined value and an eighth predetermined value, the microcomputer determines the voltage at the collector of transistor 200 using sensing circuit 41 and the voltage at the cathode of diode 204 (line 44), subtracts the voltage value on line 44 from the determined collector voltage and determines if the resultant subtraction is greater than a predetermined limit. If its is, the back-up drive circuit is disabled. The resultant subtraction is a value which is functionally related to the power dissipation by transistor 200.

If the lamp 12 is short circuit while the backup drive circuit 30 is trying to energize the lamp, the current flow through the backup drive circuit increases. The increased current flow through the backup drive circuit increases the voltage developed across the sensing resistor 206 to a value greater than a fifth predetermined value.

Referring to FIG. 4, the inverter switch circuit 48 includes a transistor 300 having its collector connected to the positive potential V through a resistor 302. The collector of transistor 300 is further connected to the base of transistor 210 of the backup drive circuit 30 through line 214. The emitter of the transistor 300 is connected to the first ground reference 22. A resistor 304 is connected between the base and the emitter of the transistor 300. The base of the transistor 300 is coupled through a resistor 306 to output 52 of the microcomputer 46.

When no second control signal is provided, the output 52 of the microcomputer 46 is normally HIGH thereby maintaining transistor 300 normally ON. When the transistor 300 is ON, line 214 is LOW which, in turn, disables the backup drive circuit 30. When the second control signal is provided, output 52 goes LOW and the transistor 300 turns OFF. Line 214 then goes HIGH and enables the backup drive circuit 30 to energize the lamp 12.

When (i) the first control signal is provided to enable the main drive circuit 20 and (ii) the first sensing circuit 24 indicates the lamp 12 not energized for a reason other than a detected electrical short in or excessive current draw by the lamp, the microcomputer 46 generates the second control signal to enable the backup drive circuit 30. In accordance with a preferred embodiment of the present invention, the microcomputer 46 is programmed so that if the second sensing circuit 34 provides a signal indicating that the backup drive circuit has not energized the lamp for a reason other than a detected electrical short in or excessive current draw by the lamp, the microcomputer 46 continuously provides both the first and second control signals to the main drive circuit 20 and the backup drive circuit 30, respectively.

The inverter switch circuit 48 is referenced to the first ground reference 22. If the first ground reference 22 becomes disconnected from the circuit 10, current flows through pull-up resistor 302 and turns ON transistor 210. When transistor 210 is ON, transistor 200 turns ON resulting in the lamp 12 being energized. Also, current flows from microcomputer 46 through line 52, resistor 306 and the base-emitter of transistor 300 to the first ground reference 22. The current then flows through the Zener diode 36, the transistor 200, the diode 204, and the resistor 206 to the second ground reference 32. A voltage is developed at the cathode of the Zener diode 36. This voltage is monitored by the A/D converter on line 40 through resistor 104 of the sensing circuit 24. The microcomputer monitors the voltage and can record the information, i.e., loss of the first ground reference 22, in a nonvolatile memory 310 such as an EEPROM for later diagnostic purposes. It will be appreciated that when either the second control signal is provided on line 52 by the microcomputer or the first ground reference 22 becomes open-circuited from the inverter switch circuit 48, line 214 goes to a digital HIGH and enables the backup drive circuit 30. The lamp 12, in turn, is energized.

The microcomputer 46 is referenced to the second ground reference 32. If the microcomputer becomes open-circuited from the second ground reference 32, no electrical potential is provided at the output 50. As mentioned above, the resistive values of resistors 106, 110, 112, 114 are selected so that transistor 108 would be biased ON if the main drive circuit 20 were to become disconnected from the microcomputer 46 or the microcomputer was not able to provide electrical potential sufficient to pull the base of transistor 108 down to turn it OFF. The main drive circuit 22 is, thereby, enabled to energize the lamp 12. Therefore, if either the first ground reference 22 becomes open-circuited or the second ground reference 32 becomes open-circuited, the lamp 12 is automatically energized through the ground reference that has not open-circuited.

The preferred embodiment described is adapted to have the state of the first control signal from output 50. opposite from the state of the second control signal from output 52 to actuate their associated drive circuits. Specifically, when it is desired to energize the lamp 12, output 50 goes HIGH. If the microcomputer 46 attempts to energize the lamp 12 with the backup drive circuit, the output 52 goes LOW. If a failure of the microcomputer 46 results in the two outputs 50, 52 latching together so that both are HIGH or both are LOW, the lamp is energized.

Figure 6:
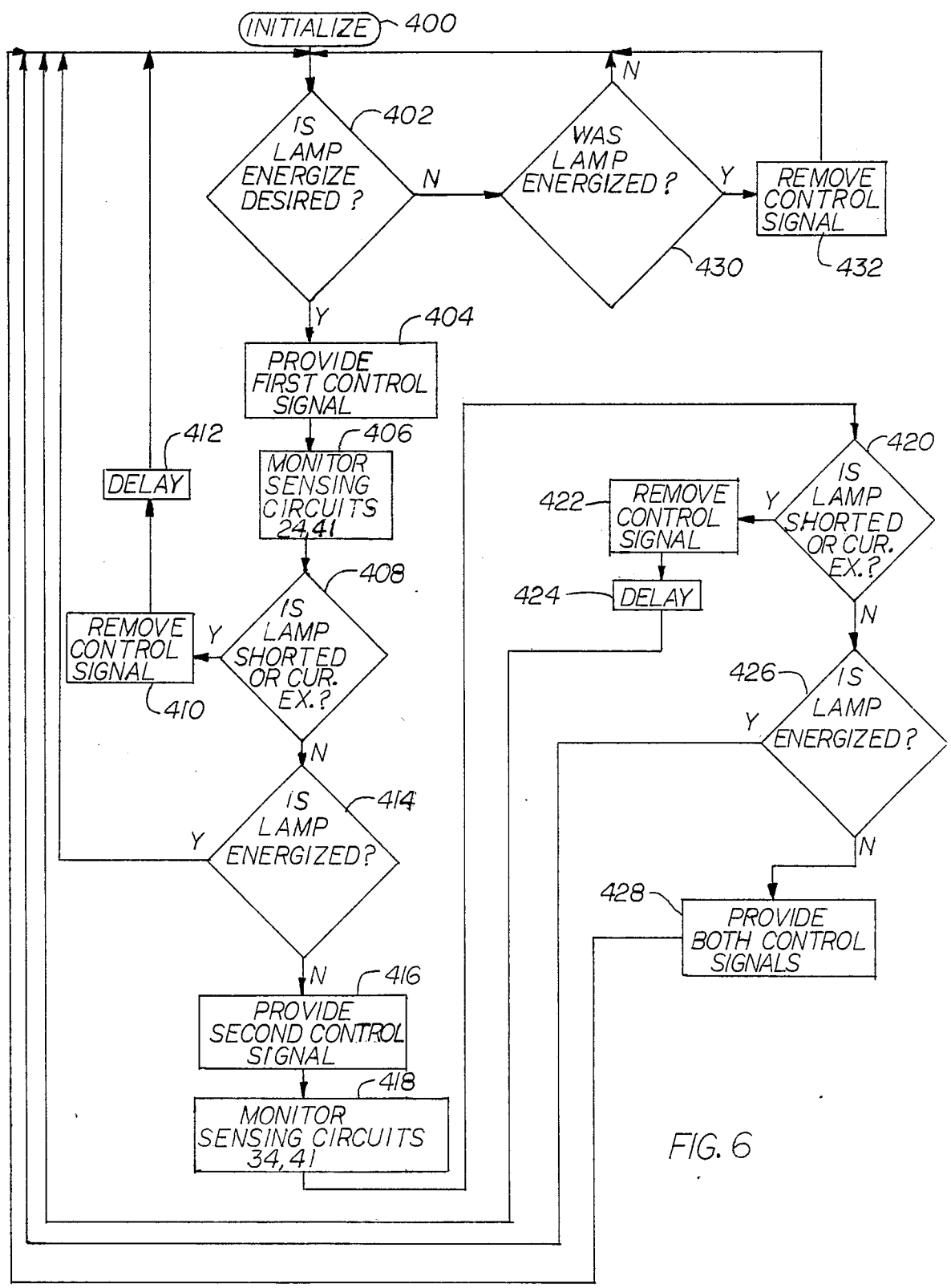
FIG. 6 is a flow chart depicting operating logic used by the microcomputer of the lamp drive and monitoring circuit of FIG. 1.

Referring to FIG. 6, a flow chart is shown illustrating the operation of the microcomputer 46. In step 400, a program is initialized upon power-up of the circuit 10 in a manner well known in the art. The program proceeds to step 402 where a determination is made as to whether or not it is desired to energize the lamp. This determination is made by monitoring the input signal 60. If the determination in step 402 is affirmative, the program proceeds to step 404 where the microcomputer provides the first control signal on line 50. In step 406, the microcomputer monitors the output of the sensing circuit 24 and sensing circuit 41 through the A/D converter 42. A determination is made in step 408 as to whether the lamp is shorted or excessive current is being drawn. One part of this determination is made by the microcomputer determining if the voltage across resistor 104 is above a predetermined limit which is indicative of a shorted lamp condition. If the voltage developed across the sense resistor is between two predetermined limits, the collector/emitter voltage is determined in a manner as described above. If the collector/emitter voltage exceeds a predetermined limit thereby indicating excessive power dissipation, excessive current is being drawn. If the determination in step 408 is affirmative, the first control signal is removed in step 410 and the program proceeds to step 412 where the microcomputer times out a predetermined time period. The program then returns to step 402. If it is still desired to energize the lamp, the steps 404, 406 and 408 are continued to be repeated until the determination in step 402 is negative or the determination in step 408 is negative. The time delay 412 permits cooling of the main drive transistor 100 so that the temperature of the transistor will not exceed the manufacturer's specification.

If the determination in step 408 is negative, the program proceeds to step 414 where a determination is made as to whether the lamp is energized. Again, the microcomputer makes this determination by monitoring the voltage across the resistor 104. If the determination in step 414 is affirmative, the program proceeds back to step 402. If the determination in step 414 is negative, the program proceeds to step 416 where the microcomputer provides the second control signal on line 52. In step 418, the microcomputer monitors the output signal from a sensing circuit 34 and sensing circuit 41 through the A/D converter 42. A determination is made in step 420 as to whether or not the lamp is shorted or excessive current is being drawn. If the voltage across resistor 206 is greater than a predetermined value, a short is said to exist in the lamp. If the voltage across resistor 206 is between two limits, the microcomputer determines the voltage on line 202 and line 44 and subtracts the determined values. If the subtraction value exceeds a predetermined limit, excessive current is being drawn. If the determination in step 420 is affirmative, the program proceeds to step 422 where the second control signal is removed. The microcomputer then times out a time delay in step 424 which is of sufficient length to allow the drive transistor 200 to cool off so as not to exceed the temperature specification provided by the manufacturer. The program proceeds from step 424 back to step 402.

If the determination in step 420 is negative, the program proceeds to step 426 where a determination is made as to whether or not the lamp is energized. If the determination in step 426 is affirmative, the program proceeds to step 402. If the determination in step 426 is negative, the microcomputer outputs both the first and second control signals in step 428. The programs proceeds from step 428 back to step 402. If both control signals are provided in step 428 and the determination in step 402 is affirmative, the program proceeds to step 404 where the first control signal is provided, while the second control signal remains output from the microcomputer. In essence, the microcomputer will continue to output both control signals until the determination in step 402 is negative.

When the determination in step 402 is negative, the program proceeds to step 430 where a determination is made as to whether or not the lamp was energized. If the determination in step 430 is negative, the program loops back to step 402. If the determination in step 430 is affirmative, the program proceeds to step 432 where the control signal is removed. The program then returns to step 402.

As mentioned, the microcomputer continuously, i.e., each machine cycle, monitors the lamp to determine if an open circuit is present. If the lamp is energized, the potential on line 43 is substantially ground. To test for an open circuit when one of the drive circuits is enabled, the microcomputer, momentarily disables the drive circuit, measures the voltage on line 43 and determines if the lamp is open circuited. If the determination is affirmative, the microcomputer enables both the main drive circuit and the backup drive circuit.

The invention has been described with reference to energizing an incadescent bulb. The invention is also applicable to energizing any electrically actuatable indicating device including an electronic instrument panel (IP). Rather than battery voltage being present on terminal 16, a logic voltage such as 5 VDC would typically be present. The IP indicator would be energized by connecting the terminal to one of the two grounds (logic LOW) as described above. If the microcomputer senses 5 VDC on the terminal 16 using the sensing circuit 41, the indicator of the electronic IP is not open circuited from the circuit 10. The indicator for the electronic IP would receive its power from a regulator for the IP. The voltage limits to determine excessive current draw or short circuit of the indicator would be different for an electronic IP than an incadescent bulb.

This invention has been described above with reference to a preferred embodiment. Modification and alterations will become apparent to one skilled in the art upon reading and understanding this specification. It is our intention to include all such modifications and alterations within the scope of the appended claims or their equivalent thereof.

Having described a specific preferred embodiment of the invention, the following is claimed:

1. An apparatus for energizing an indicator lamp comprising:
   means for connecting one terminal of the lamp to a first electrical terminal, said first electrical terminal having an electrical potential present threat;
   a main circuit for, when enabled by a first control signal, connecting a second terminal of the lamp to a second electrical terminal, said second electrical terminal having a first electrical ground reference present thereat, a difference in electrical potential between the first and second electrical terminals being sufficient to energize the lamp;
   a backup circuit for, when enabled by a second control signal, connecting the second terminal of the lamp to a third electrical terminal, said third electrical terminal having a second electrical ground reference present thereat, a difference in electrical potential between the first and third electrical terminals being sufficient to energize the lamp;
   sensing means for providing a signal indicative of the lamp being energized; and
   control means for providing said first control signal, said second control signal, and for monitoring said signal provided by said sensing means, said control means providing said second control signal when said first control signal is provided and said signal from said sensing means indicates the lamp is not energized.

2. The apparatus of claim 1 wherein said main circuit includes first actuatable switching means for providing a current path between the second electrical terminal of the lamp and the first electrical ground reference when actuated by said first control signal, and wherein said backup circuit includes second actuatable switching means for providing a current path between the second electrical terminal of the lamp and the second electrical ground reference when actuated by said second control signal.

3. The apparatus of claim 2 further including means for sensing the voltage present at said second electrical terminal of the lamp and for generating a signal indicative thereof, and said control means further including means to determine from said voltage sensing means if the lamp is open circuited.

4. The apparatus of claim 2 wherein said first actuatable switching means includes a first solid state switching device having a first terminal connected to the second electrical terminal of the lamp, a second terminal coupled to the first electrical ground reference, and a control input responsive to said first control signal so as to permit current flow between said first and second terminals of said first solid state switching device.

5. The apparatus of claim 4 wherein said second actuatable switching means includes a second solid state switching device having a first terminal connected to said second electrical terminal of the lamp, a second terminal coupled to the second electrical ground reference, and a control input responsive to said second control signal so as to permit current flow between said first and second terminals of said second solid state switching device.

6. The apparatus of claim 5 wherein said sensing means includes a first sensing resistor connected between said second terminal of said first solid state switching device and the first electrical ground reference, said first sensing resistor developing a voltage thereacross having a value indicative of the current flow through said main circuit, a voltage value across said first sensing resistor being below a first predetermined value being indicative of the lamp not energized.

7. The apparatus of claim 6 wherein said sensing means further includes a second sensing resistor connected between said second terminal of said second solid state switching device and the second electrical ground reference, said second sensing resistor developing a voltage thereacross having a value indicative of the current flow through said backup circuit, a voltage value across said second resistor being below a second predetermined value being indicative of the lamp being open circuited.

8. The apparatus of claim 7 wherein said sensing means further includes a third solid state switching device, said third solid state switching device having a first terminal connected to said control input of said first solid state switching device, a second terminal connected to the first electrical ground reference, and a control input connected to said second terminal of said first solid state switching device, said third solid state switching device being actuatable to provide a current path between its first and second terminals, thereby reducing the value of said first control signal, when the voltage value across said first sensing resistor reaches a third predetermined value, said first solid state switching device reducing current flow therethrough in response to the reduced value of said first control signal.

9. The apparatus of claim 8 wherein said control means further includes means reponsive to the voltage value developed across said first sensing resistor so as to remove said first control signal from said first switching device when said developed voltage reaches a fourth predetermined valued.

10. The apparatus of claim 8 further including means for providing a signal indicative of the voltage value present at the second electrical terminal of the lamp and said control means further includes means for determining power dissipated by said first solid state switching device and means to remove said first control signal from said first switching device when the determined power dissipation by said first solid state switching device exceeds a predetermined limit.

11. The apparatus of claim 8 wherein said sensing means further includes a fourth solid state switching device, said fourth solid state switching device having a first terminal connected to said control input of said second solid state switching device, a second terminal connected to the second electrical ground reference, and a control input connected to said second terminal of said second solid state switching device, said fourth solid state switching device being actuated to provide a current path between its first and second terminal, thereby reducing the value of said second control signal, when the voltage value across said second sensing resistor reaches a fourth predetermined value, said second solid state switching device reducing current flow therethrough in response to the reduced value of said second control signal.

12. The apparatus of claim 11 wherein said control means further includes means responsive to the voltage value developed across said second sensing resistor so as to remove said second control signal from said second switching device when said developed voltage reaches a fifth predetermined value.

13. The apparatus of claim 11 further including means for providing a signal indicative of the voltage value present at the second electrical terminal of the lamp and said control means further includes means for determining power dissipated by said second solid state switching device and means to remove said second control signal from said second switching device when the determined power dissipation by said second solid state switching device exceeds a predetermined limit.

14. The apparatus of claim 11 wherein said control means is a microcomputer and wherein said sensing means further includes an analog-to-digital converter having one input coupled to said first sensing resistor, another input coupled to said second sensing resistor, and an output coupled to an input of said microcomputer, said analog-to-digital converter providing a digitized signal to the microcomputer indicative of the voltage developed across said first and said second sensing resistors.

15. The apparatus of claim 1 wherein said sensing means includes means for providing a voltage signal having a value that varies as a function of the current flow through the lamp, a value of the voltage signal being a predetermined voltage value being indicative of the lamp being energized.

16. The apparatus of claim 15 wherein said means for providing a voltage signal is a resistor connected in series with the lamp, the voltage signal across said resistor varying as a function of the current flowing through the lamp.

17. The apparatus of claim 15 wherein said control means is a microcomputer, and wherein said sensing means further includes an analog-to-digital converter connected to said means for providing a voltage signal and to said microcomputer for providing said microcomputer with a digitized signal representation of the voltage value provided by said sensing means.

18. A device for energizing an indicator lamp comprising:
a first electrical ground reference;

a second electrical ground reference;

means connected to one terminal of the lamp for providing electrical potential relative to said first ground reference and to said second ground reference;

first actuatable switch means responsive to a first control signal for providing a connection between the other lamp terminal and the first ground reference;

sensing means for providing a signal indicative of the other terminal of the lamp not being connectable to said first electrical ground reference through said first actuatable switch means; and second actuatable switch means for connecting the other terminal of the lamp to said second ground reference when said sensing means provides said signal indicative of the other terminal of the lamp not being connectable to said first ground reference.

19. A device for energizing an indicator lamp having first and second terminals, said device comprising:

a first ground reference;

a second ground reference;

means connected to the first terminal of the lamp for providing electrical potential relative to said first ground reference and to said second ground reference, said electrical potential being of sufficient value to energize the lamp;

first sensing means for providing a signal indicative of the lamp being energized;

a main circuit for, when enabled by a first control signal, connecting the second terminal of the lamp to said first electrical ground reference;

a backup circuit for, when enabled by a second control signal, connecting the second terminal of the lamp to said second electrical ground reference;

second sensing means for providing said second control signal when the second terminal of the lamp is sensed as not being connectable to said first electrical ground reference; and control means for providing said first control signal, said second control signal, and for monitoring said signal provided by first sensing means and said signal provided by second sensing means, said control means providing said second control signal when said first control signal is provided and said signal from said first sensing means indicates the lamp is not energized.

20. An apparatus for energizing an indicator lamp comprising:

means for connecting one terminal of the lamp to a first electrical terminal, said first electrical terminal having an electrical potential present thereat;

a main drive circuit for, when enabled by a first digital control signal, connecting a second terminal of the indicator lamp to a second electrical terminal, said second electrical terminal having a first electrical ground reference present thereat, a difference in electrical potential between the first and second electrical terminals being sufficient to energize the lamp;

a backup drive circuit for, when enabled by a second digital control signal, connecting the second terminal of the indicator lamp to a third electrical terminal, said third electrical terminal having a second electrical ground reference present thereat, a difference in electrical potential between the first and third electrical terminals being sufficient to energize the lamp;

said first digital control signal being one digital state for enabling said main drive signal and said second digital control signal being another digital state for enabling said backup drive circuit;

means for sensing when the indicator lamp is energized by the source of electrical energy; and control means for providing said first digital control signal in response to an input signal and for providing said second digital signal when said first digital control signal is provided and said sensing means indicates that the lamp is not energized.

21. The apparatus of claim 20 wherein a first electrical terminal of the lamp is connected to one terminal of a source of electrical energy, and wherein said main drive circuit includes first actuatable switching means for connecting the second electrical terminal of the lamp to the first electrical ground reference when actuated by said first control signal, and wherein said backup circuit includes second actuatable switching means for connecting the second electrical terminal of the lamp to the second electrical ground reference when actuated by said second control signal.

22. The apparatus of claim 21 wherein said first actuatable switching means includes a first solid state switching device having a first terminal connected to the second electrical terminal of the lamp, a second terminal coupled to the first electrical ground reference, and a control input responsive to said first control signal to connect said first and second terminals of said first solid state switching device together.

23. The apparatus of claim 22 wherein said second actuatable switching means includes a second solid state switching device having a first terminal connected to said second electrical terminal of the lamp, a second terminal coupled to the second electrical ground reference, and a control input responsive to said second control signal to connect said first and second terminal of said second solid state switching device together.

24. The apparatus of claim 23 wherein said sensing means includes a first sensing resistor connected between said second terminal of said first solid state switching device and the first electrical ground reference, said first sensing resistor developing a voltage thereacross having a value indicative of the current flow through said main drive circuit, a voltage value across said first sensing resistor being below a first predetermined value being indicative of the lamp not being energized.

25. The apparatus of claim 24 wherein said sensing means further includes a second sensing resistor connected between said second terminal of said second solid state switching device and the second electrical ground reference, said second sensing resistor developing a voltage thereacross having a value indicative of the current flow through said backup circuit, a voltage value across said second resistor being below a second predetermined value being indicative of the lamp not being energized.

26. The apparatus of claim 25 wherein said sensing means further includes a third solid state switching device, said third solid state switching device having a first terminal connected to said control input of said first solid state switching device, a second terminal connected to the first electrical ground reference, and a control input connected to said second terminal of said first solid state switching device, said third solid state switching device being actuated to provide a current path between its first and second terminals, thereby reducing the value of said first control signal when the voltage value across said first sensing resistor reaches a third predetermined, said first solid state switching device reducing current flow therethrough in response to the reduced value of said first control signal.

27. The apparatus of claim 26 wherein said control means further includes means responsive to the voltage value developed across said first sensing resistor so as to remove said first control signal from said first switching device when said developed voltage reaches a fourth predetermined value.

28. The apparatus of claim 26 wherein said sensing means further includes a fourth solid state switching device, said fourth solid state switching device having a first terminal connected to said control input of said second solid state switching device, a second terminal connected to the second electrical ground reference, and a control input connected to said second terminal of said second solid state switching device, said fourth solid state switching device being actuated to provide a current path between its first and second terminals, thereby reducing the value of said second control signal when the voltage value across said second sensing resistor reaches a fourth predetermined, said second solid state switching device reducing current flow therethrough in response to the reduced value of said second control signal.

29. The apparatus of claim 28 wherein said control means further includes means responsive to the voltage value developed across said second sensing resistor so as to remove said second control signal from said second switching device when said developed voltage reaches a fifth predetermined value.

30. The apparatus of claim 28 wherein said control means is a microcomputer and wherein said sensing means further includes an analog-to-digital converter having one input coupled to said second sensing resistor, another input coupled to said second sensing resistor, and an output coupled to an input of said microcomputer, said analog-to-digital converter providing a digitized signal to the microcomputer indicative of the voltage developed across said first and said second sensing resistors.

31. The apparatus of claim 30 wherein said sensing means includes means for providing a voltage signal having a value that varies as a function of the current flow through the lamp, a value of the voltage signal being greater than a predetermined voltage value being indicative of the lamp being energized.

32. The apparatus of claim 31 wherein said means for providing a voltage signal is a resistor connected in series with the lamp, the voltage signal across said resistor varying as a function of the current flowing through the lamp.

33. The apparatus of claim 31 wherein said control means is a microcomputer, and wherein said sensing means further includes an analog-to-digital converter connected to said means for providing a voltage signal and to said microcomputer for providing said microcomputer with a digitized signal representation of the voltage value provided by said sensing means.

* * * * *

UNITED STATES PATENT AND TRADEMARK OFFICE
CERTIFICATE OF CORRECTION

PATENT NO. : 4,903,011

DATED : February 20, 1990

INVENTOR(S) : James H. Reinholm, Dana A. Stonerook, and Roger A. McCurdy

It is certified that error appears in the above-identified patent and that said Letters Patent is hereby corrected as shown below:

Column 12, Line 37, Claim 1, change "threat" to --thereat--.

Column 14, Line 16, Claim 11, change "terminal" to --terminals--

Column 16, Line 39, Claim 23, change "terminal" to --terminals--

Column 18, Line 7, Claim 30, change "second" to --first--

Signed and Sealed this

Fourth Day of December, 1990

Attest:

HARRY F. MANBECK, JR.

Attesting Officer     Commissioner of Patents and Trademarks